Figure 1:
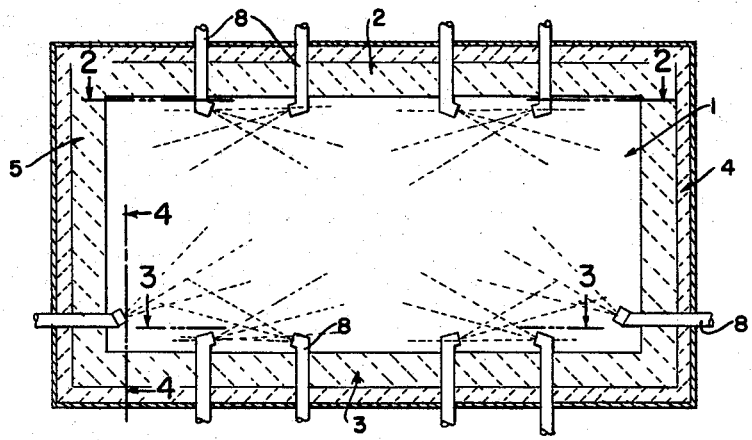

Oct. 25, 1960     A. C. WARNER     2,957,755

METHOD OF PRODUCING CARBON BLACK

Filed June 11, 1957     2 Sheets-Sheet 1

INVENTOR
AMOS C. WARNER
BY
*Pennie, Edmonds, Morton, Barrows & Taylor*
ATTORNEYS

INVENTOR
AMOS C. WARNER

United States Patent Office 2,957,755
Patented Oct. 25, 1960

2,957,755
METHOD OF PRODUCING CARBON BLACK

Amos C. Warner, Monroe, La., assignor to Columbian Carbon Company, New York, N.Y., a corporation of Delaware Filed June 11, 1957, Ser. No. 664,986

3 Claims. (Cl. 23—209.4)

This invention relates to the manufacture of carbon black by the decomposition of hydrocarbons, effected by dispersing the hydrocarbon in a turbulent stream of hot blast flame gases at a temperature in excess of that at which the hydrocarbons are decomposed to carbon black.

In the Ekholm et al. Patent 2,597,232, there is described and claimed a process of that type whereby a plurality of symmetrically-spaced streams of a combustible gas mixture are blasted longitudinally into one end of an elongated, heat-insulated, reaction chamber of rectangular cross-section and of relatively narrow width and burned therein to form a turbulent stream of hot blast flame gases flowing longitudinally through the chamber at a temperature in excess of the decomposition temperature of hydrocarbons, and the hydrocarbons to be decomposed, herein referred to as "hydrocarbon make," are separately introduced through the opposite walls of the chamber, and forcefully injected across the lesser dimension of the chamber, as a multiplicity of streams, positioned substantially perpendicular to the chamber walls of greater dimension, into the flowing stream of hot gases at a zone of the chamber downstream from the zone of primary combustion.

The process of that patent has been extensively used in the production of carbon blacks embodying highly desirable rubber compounding characteristics. It has been found especially effective, when the hydrocarbon make is introduced into the furnace chamber in gas or vapor form, in producing carbon blacks of the FF grade embodying a highly desirable combination of characteristics, including relatively low or normal structure especially useful for certain rubber compounding purposes.

By reason of present economic limitations on the use of natural gas and the difficulties and expense involved in vaporizing liquid oils prior to introducing them into the furnace chamber, it has become highly desirable to use a normally liquid hydrocarbon make and to inject the make into the furnace chamber as an atomized liquid spray.

The characteristics of a carbon black are influenced by the nature of the hydrocarbon make from which it is prepared, but they are also greatly influenced by the operating conditions under which the carbon black is formed. Serious difficulties have been encountered in attempting to produce, in furnaces of the type described, carbon blacks of the FF grade just noted, having low or moderate structure characteristics, by the injection of atomized liquid sprays of the hydrocarbon make into the stream of hot furnace gases.

Because of the extraordinarily high temperature of the furnace side-wall at the zone of injection and the resultant tendency of the liquid hydrocarbon make to coke in the injection tubes, due to excessive heating in passing through the chamber wall, special precautions are usually necessary to prevent such excessive heating.

In the Heller Patent 2,659,662, for instance, there is described and claimed a method by which the hydrocarbon make is effectively thermally shielded as it is passed in liquid form through the hot side-wall of the furnace chamber and is thereafter injected as gas-atomized liquid sprays into the stream of hot blast flame gases. As therein disclosed, the atomized sprays are directed substantially radially into the chamber through symmetrically positioned injection nozzles so arranged that the entering streams of hydrocarbon make spray are subjected to tremendous shearing forces of the extremely high velocity blast flame gases flowing substantially perpendicular to the entering make streams, whereby the spray streams are suddenly shattered as they enter the chamber.

In the particular operation shown in the last mentioned patent, the combustible mixture is forcefully injected tangentially into the upstream end of the furnace chamber and burned therein to form a turbulent stream of hot blast flame gases swirling at tremendous velocity as it passes through the chamber.

Though the process employing this tangential-blast has the advantage of permitting the injection of the hydrocarbon make in the form of liquid sprays, there is a tendency to produce carbon blacks of relatively high structure and high oil absorption characteristics. On the other hand, where the combustible mixture is blasted longitudinally into the furnace chamber, as disclosed by the above-noted Ekholm et al. patent, attempts to inject the hydrocarbon make as liquid sprays have not heretofore resulted in carbon blacks having the presently desired high color and low or normal structure, and further have resulted in excess coke formation.

While I do not intend to be bound by any theory as to the cause of the difficulties heretofore experienced when it has been attempted to inject the hydrocarbon make in the form of liquid sprays in operations of the type of the Ekholm et al. patent, nor any theory as to the avoidance of such difficulties by my present process, it is my present belief that these difficulties are due primarily, at least, to the impingement of the particles of one liquid spray stream upon those of the adjacent or opposite spray stream causing the particles to coalesce in some way, possibly while in the process of vaporization or decomposition, so as to increase structure characteristics and particle size of the resultant carbon black. It is also believed that such impingement may form larger liquid particles which are more readily deposited on the chamber wall as coke. The possibility of such impingement of the particles of one liquid spray upon the particles of another spray, with resultant coalescence of the particles, is more likely in this type of operation, due to the fact that the blast flame velocities are substantially less than those in processes where the combustible mixture is tangentially injected and, therefore, the liquid sprays are less rapidly shattered by, and dispersed in, the hot gases.

It is a primary object of the present invention to provide a process by which carbon blacks of high color having low to normal structure characteristices can be readily and economically produced from normally liquid hydrocarbon makes, atomized as a liquid spray into the furnace chamber.

I have now found that furnace blacks embodying this desirable combination of characteristics, as well as carbon blacks having somewhat different properties, may be readily produced from normally liquid hydrocarbon make, without excessive coke formation, by injecting it into the furnace chamber as liquid sprays in operations of the type described in the previously noted Ekholm et al. Patent 2,597,232, provided the liquid sprays are directed into the furnace chamber in the manner hereinafter described.

Predicated upon this discovery, my present invention provides improvements in operations of the type described in the said Ekholm et al. patent in accordance with which the stream of blast flame gases is generated by injecting a combustible mixture of a hydrocarbon fuel and an oxygen-containing gas substantially longitudinally into one end of the elongated, heat-insulated furnace chamber as a plurality of streams uniformly spaced over the cross-sectional area of the chamber, and burning the combustion mixture as it enters the chamber to form a turbulent, high velocity stream of hot blast flame gases passing longitudinally through the chamber, and the hydrocarbon make is injected into the stream of hot gases, from opposite sides thereof, at a zone downstream from the zone of primary combustion, as a plurality of streams of atomized liquid, so directed into the rectangular chamber that impingement of each spray stream upon opposite or adjacent spray streams or chamber walls is substantially or completely avoided. This is accomplished by directing the respective spray streams diagonally across the chamber at angles, depending upon the spread angle of the sprays, so that the liquid particles of the respective streams travel along separate, nonconflicting paths, each stream being directed inwardly from the chamber wall, through which it enters, at an angle A at least equal to one-half the angle of spread of the spray, so as to avoid direct impingement of the spray on said furnace wall.

Figure 2:
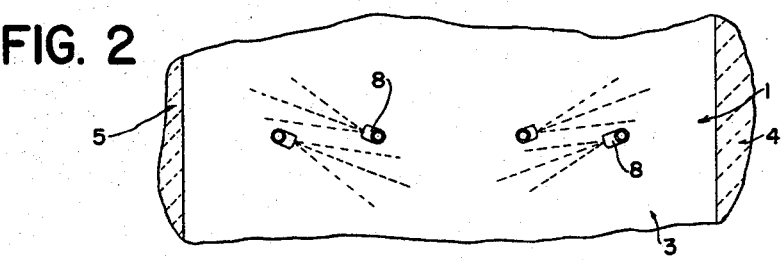
Figure 3:
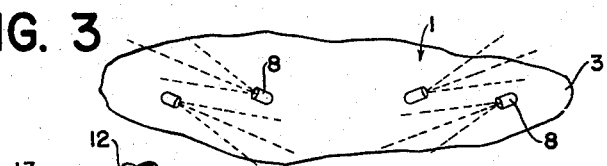
Figure 5:
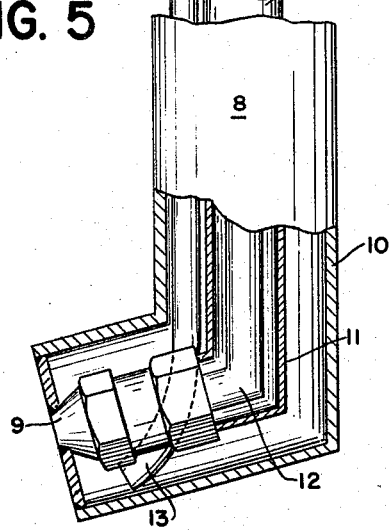
Figure 4:
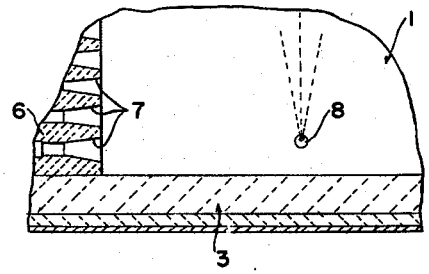
Figure 6:
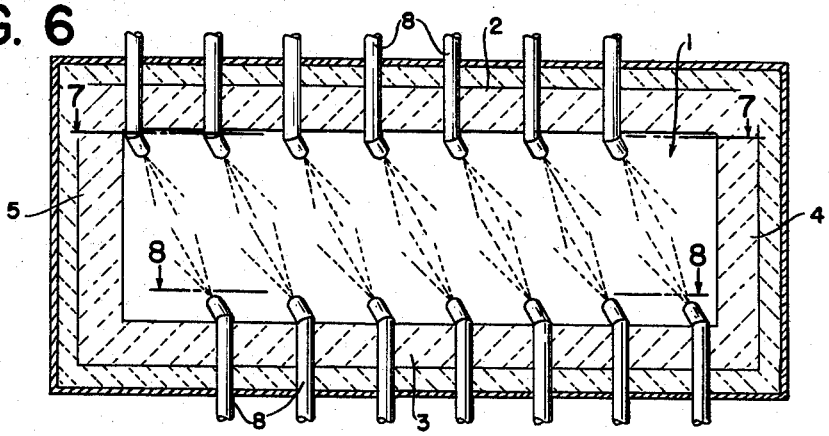
Figure 7:
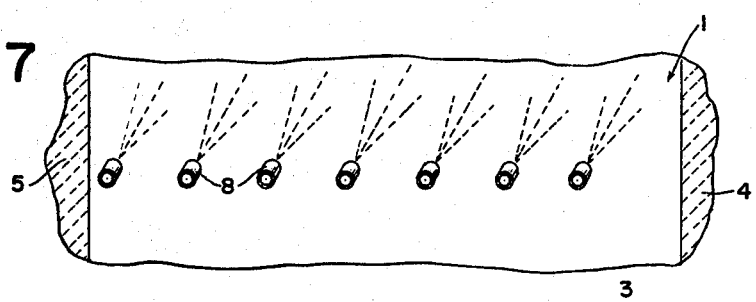
Figure 8:
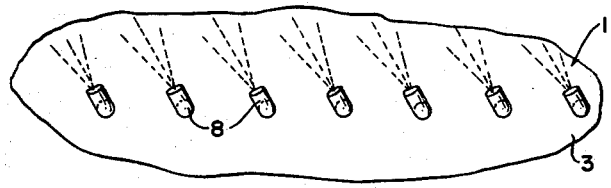

The invention will be further described and illustrated with reference to the accompanying drawings which represent conventionally and diagrammatically, and somewhat fragmentarily, apparatus of the type more fully disclosed in the said Ekholm et al. patent but modified in accordance with this invention, and of which Fig. 1 is a sectional view of a rectangular furnace chamber along a transverse plane at the point of hydrocarbon make injection, Fig. 2 is a fragmentary horizontal view along line 2—2 of Fig. 1, showing the roof sprays, Fig. 3 is a fragmentary horizontal view along line 3—3 of Fig. 1, showing the floor sprays, Fig. 4 is a fragmentary elevational view along line 4—4 of Fig. 1, showing a side spray, Fig. 5 is a fragmentary somewhat enlarged view, partly in section, of a hydrocarbon make injection assembly which has been used with advantage, Fig. 6 is a sectional view of a rectangular furnace chamber along a transverse plane at the point of hydrocarbon make injection showing an alternative arrangement of the spray nozzles, Fig. 7 is a fragmentary horizontal view of the furnace chamber of Fig. 6 showing the direction of the sprays of the hydrocarbon make injected through the furnace roof, and Fig. 8 is a fragmentary horizontal view of the chamber of Fig. 6 showing the direction of the sprays of hydrocarbon make injected through the floor wall of the chamber.

As more fully shown in the said Ekholm et al. Patent 2,597,232, an elongated, heat-insulated furnace chamber of rectangular cross-section is represented at 1. This chamber leads at its downstream end to a cooling and collection system, as is well understood by this art and need not here be further described.

Chamber 1 is delineated by roof-wall 2, a floor-wall 3 and relatively narrow side-walls 4 and 5, respectively, usually constructed, as well-known to the art, of an inner layer of furnace refractory surrounded by heat insulation material.

A burner block indicated at 6, in Fig. 4, is fitted into the upstream end of chamber 1 and is provided with a plurality of blast burner ports 7 uniformly spaced over the entire transverse area of the burner block. Means, not shown, are provided for blasting a combustible mixture, for instance a hydrocarbon fuel gas and air, through the burner ports into the furnace chamber. This mixture is burned as it enters the chamber to form a high velocity, turbulent stream of hot blast flame gases which passes longitudinally through the furnace chamber at a temperature in excess of the decomposition temperature of hydrocarbon.

The hydrocarbon make is passed inwardly through the furnace walls as a plurality of liquid streams, advantageously having their longitudinal axes lying in a common plane equidistant from the burner block. For this purpose, there is provided a number of hydrocarbon make injection assemblies indicated at 8 passing perpendicularly through the respective chamber walls. These injection assemblies are with advantage so constructed that the entering streams of liquid make are thermally shielded from the hot chamber walls to avoid overheating and coking of the hydrocarbon make passing therethrough. They are provided at their inner ends with spray nozzles 9, as shown in Fig. 5 which represents a two-fluid spray hydrocarbon make injection assembly which I have used with particular advantage.

The injection assembly shown in Fig. 5 comprises an outer cylindrical jacket 10 closed at each end and of sufficient length to extend entirely through the furnace side-walls and to project slightly, i.e. 1 to 3 inches, into the chamber. The hydrocarbon make is charged under moderate pressure through the annular conduit 11 to the spray nozzle 9 where it mixes with the atomizing gas, for instance steam, charged through the inner conduit 12 under similar moderate pressure, usually not in excess of 100 pounds per square inch. A cooling fluid, advantageously water, is charged through conduit 13, which extends substantially longitudinally through the jacket 10 and discharges the cooling fluid at the inner end of the jacket in contact with the spray nozzle 9. The cooling fluid then flows outwardly in thermal shielding relation with the make stream and is discharged from the jacket beyond the outer furnace wall.

The assembly just described is so constructed that the axes of the inner ends of conduits 11 and 12 and of spray nozzle 9 form a substantial angle, $\alpha$, with the inwardly extended longitudinal axis of the main portion of outer jacket 10 where that jacket passes through the furnace wall. This angle $\alpha$ may be varied somewhat but, for purposes of my present invention, is most advantageously about 30° to 75°.

So as to minimize the length of the path of the liquid make through the hot furnace walls, the respective assemblies are so positioned as to extend perpendicularly through the wall. Therefore, the angle $\alpha$ is determinative of the angle A between the axes of symmetry of the liquid spray and the inner surface of the furnace wall through which the particular make stream is introduced, i.e., 90° minus $\alpha$ or within the range of 15°–60°.

In order to minimize the effect of thermal head in the furnace chamber, I presently prefer to position the chamber so that its minimum transverse dimension is vertical, as indicated in Figs. 1 and 6. It will be understood, however, that the invention is not restricted in that respect. But, in the following description, I shall hereinafter refer to the confining walls of greater width as the roof-wall and floor-wall, respectively, and shall refer to the walls of lesser dimension as side-walls.

In the particular apparatus represented by Fig. 1, four hydrocarbon make injection assemblies are symmetrically positioned, with their axes lying in a common transverse plane, extending through the roof-wall and the floor-wall, respectively, of the furnace chamber and one hydrocarbon make injection assembly positioned near the bottom of each of the side-walls, with their axes also lying in said common plane.

The number and positioning of the spray assemblies is subject to variation depending primarily upon the cross-sectional dimensions and relative proportions of the chamber. The specific arrangements shown in the drawings have been found especially suitable for chambers of an interior width of about 6 feet and an interior height of about 2 feet.

As there shown, the side-wall assemblies are positioned 3 inches above the floor, the outer roof-wall and floor-wall assemblies are positioned 4 inches in from the side-walls and the inner roof-wall and floor-wall assemblies are positioned about 2 to 2½ feet from the outer floor-wall and roof-wall assemblies.

The direction of the axis of symmetry of the respective sprays, as previously noted, may likewise be varied somewhat depending upon the angle of spread characteristic of the spray nozzles used. Spray nozzles having an angle of spread of about 30° have been used with advantage.

In the furnace of Fig. 1 equipped with nozzles having an angle of spread of 30°, the angle α, i.e. the angle of declination of the nozzle axis from the inward extension of the longitudinal axis of the body of the spray assembly, should be within the range of 30° to 75°. If the angle α be greater than 75°, that portion of the spray streams nearest the wall of entry would be directed toward the wall and any unvaporized oil droplets would impinge thereon with resultant coking. Where the angle α is 75°, that portion of the spray streams nearest the wall of entry will be directed parallel to that wall. Therefore, the angle α should not be greater than 75°, or 90° minus one-half the nozzle spread angle.

As previously noted, it is also important that there be no impingement of one spray stream upon another. This is accomplished in the apparatus illustrated by Fig. 1 by directing the outer roof and floor sprays inwardly with their axes of symmetry directed slightly upstream at an angle β at least equal to one-half of the spread angle of the nozzle, and directing the inner roof and floor sprays outwardly with their axes of symmetry directed slightly downstream at an angle β at least equal to one-half the spread angle of the nozzle, the angle β representing the declination of the respective axes of symmetry from the transverse plane common to the axes of the main body of the respective assemblies.

In the modified arrangement shown in Figures 6–8, inclusive, of the drawings, seven roof sprays and seven floor sprays are provided, the angle α of the sprays being approximately 30° and the assemblies being spaced apart on 10-inch centers. Each of the roof sprays is directed diagonally downstream with its axis of symmetry forming with the sidewalls of the chamber an angle of approximately 30° to the right, and the floor streams being directed diagonally downstream with their axes of symmetry forming an angle with the side-walls of the chamber about 30° to the left.

In each instance, the angle β between the axis of symmetry and the transverse plane prependicular to the furnace axis is, of course, 90° minus 30°, i.e., 60°.

As a general criterion, each spray should be so directed as to provide the longest possible path without impingement on a furnace wall or another liquid spray, consistent with a substantially uniform distribution of the spray pattern over the entire transverse area of the furnace chamber.

There is a tendency for the larger oil droplets to fall to the floor of the furnace and coke thereon, thus reducing the yield of the desired carbon black. For this reason, I have found it most advantageous, when using side sprays, to position the side-wall sprays near the floor-wall and to direct the sprays generally upwardly at an angle α not less than about 60°. Under such conditions, coking has been materially minimized. With this arrangement, the axis of symmetry of these side-wall sprays may, with advantage, lie in the transverse plane common to the longitudinal axis of the spray assemblies, as shown in Fig. 4. They may be varied somewhat therefrom but without noticeable advantage.

In those embodiments of my invention illustrated in Fig. 1, I have found it advantageous to use, for the roof sprays, assemblies of which α is 75° and, for the floor sprays, assemblies of which α is slightly less, usually about 67°. This arrangement has been found to give greater uniformity of dispersion of the atomized make over the entire transverse section of the furnace chamber and greater uniformity of operation throughout the chamber, minimizing coke formation and resulting in a superior carbon black yield of the desired quality.

The invention will be illustrated by the following specific examples of operations carried on in the particular apparatus illustrated in Fig. 1 of the drawings. In each of these examples, the hydrocarbon make was a commercially available liquid residue from a Mid-Continent crude petroleum and having approximately the following characteristics:

| | |
|---|---|
| Index of refraction | 1.576 |
| A.P.I. gravity | 18.0 |
| Aromatics, percent | 50–65 |
| Sulfur, percent | 1.0 |
| Asphaltines, percent | 8.0 |
| Viscosity: | |
| SSU at 100° F. | 4500 |
| SSU at 210° F. | 245 |

This hydrocarbon make was atomized into the furnace chamber by steam under pressure. The stream of hot blast flame gases was generated by blasting a combustible mixture of natural gas and air into the upstream end of the chamber.

The air feed rate, the ratio of air to fuel gas, the rate of charge of the hydrocarbon make oil, the pressure of the atomizing steam and the color, oil absorption and yield of the resultant carbon black are set forth in the following tabulation:

*Table I*

| Example | 1 | 2 | 3 |
|---|---|---|---|
| Air Feed Rate, cu. ft./hr | 300,000 | 300,000 | 350,000 |
| Air: Fuel Gas Ratio | 8:1 | 8.5:1 | 8.5:1 |
| Oil Feed Rate, gals./hr | 325 | 310 | 350 |
| Steam Pressure, lbs./sq. in | 60 | 70 | 70 |
| Carbon Black: | | | |
| Yield, lbs./gal. of oil | 2.5 | 2.5 | 3.2 |
| Color Rating | 112 | 115 | 109 |
| Oil Absorption, gals./100 lbs | 10.4 | 10.2 | 10.3 |

It will be seen from the foregoing tabulation that the color and oil absorptions of the carbon blacks resulting from these operations closely approximated the corresponding characteristics of the standard FF grade carbon black made by conventional methods, namely, a color rating of 112 and an oil absorption of 10.5 gallons per 100 pounds of black, as determined by identical test procedure.

The rubber compounding characteristics of the resultant carbon black also closely approximated those of the control sample of FF grade carbon black produced by conventional methods. This appears from tests in which the respective carbon blacks, including the control sample, were compounded with rubber by identical conventional procedure in accordance with the following formula:

| | Parts |
|---|---|
| Smoked sheet rubber | 48.5 |
| Pale crepe rubber | 48.5 |
| Carbon black | 38.75 |
| Zinc oxide | 6.00 |
| Stearic acid | 2.15 |
| 20% diphenyl guanidine | 3.75 |
| Sulphur | 5.35 |

The respective batches were cured for sixty minutes at 290° F. and tested by identical conventional procedure with the results set forth in the following tabulation,.

expressed as percentages of the standard FF grade control rated, in each instance, as 100%:

Table II

| Carbon Black | Control | Ex. 1 | Ex. 2 | Ex. 3 |
|---|---|---|---|---|
| Modulus—L-300 | 100 | 98 | 97 | 102 |
| Tensile Strength | 100 | 97 | 101 | 98 |
| Elongation | 100 | 102 | 107 | 102 |
| Rebound | 100 | 99 | 99 | 100 |

Though the invention has been specifically illustrated by operations using a particular type of hydrocarbon make and for producing a particular grade of carbon black, its utility is not so restricted. In its broader aspect, the invention contemplates the use of various types of liquid hydrocarbon make. Likewise, various modifications in operating conditions, including feed rates and ratios, as understood in this art, may be employed within the scope of the invention to effect changes in characteristics of the resultant carbon black.

I claim:

1. In the process for producing carbon black by decomposition of hydrocarbons whereby a combustible mixture of a fuel gas and an oxygen-containing gas is blasted longitudinally into one end of an elongated, heat-insulated chamber of substantially uniform, rectangular cross-section, as a plurality of streams uniformly spaced over the cross-sectional area of the chamber, the combustible mixture is burned as it enters said chamber to form a turbulent stream of hot blast flame gases flowing longitudinally through the chamber and a plurality of streams of the hydrocarbon to be decomposed are separately and forcefully injected into the hot gas stream as it flows through the chamber, the hydrocarbon being decomposed by heat absorbed from the hot gases to form carbon black in suspension and the resultant carbon black separated and collected, the steps comprising injecting the hydrocarbon to be decomposed as a plurality of liquid spray streams, each initiated adjacent a longitudinal wall of the chamber and so directed into the hot gas stream that the axis of symmetry of the spray is initially directed inwardly from the adjacent wall at an acute angle A with said adjacent wall and also at an acute angle β with a plane perpendicular to the axis of the furnace chamber, the angles A and β being not less than one-half the spread angle of the stream and not greater than 60°, said streams being directed diagonally across the chamber in a plurality of different directions in a crisscross pattern of nonconflicting paths such as to avoid impingement of any spray stream upon another spray stream and upon the walls of said chamber.

2. The process of claim 1 in which the hydrocarbon to be decomposed is passed as a plurality of substantial liquid streams through a longitudinal chamber wall through conduits having their longitudinal axes lying in a common transverse plane and substantially perpendicular to said wall of entry, and each being thermally shielded from the furnace wall, and the hydrocarbon is sprayed into the chamber from each conduit as an atomized liquid stream having a spread angle not exceeding 30°, the axis of symmetry of the respective streams initially forming an angle with the inwardly-extending longitudinal axis of the conduit within the range of 60° to 75° and adjacent spray streams being directed in different diagonal directions across the chamber nearly perpendicular to the direction of flow of the hot gas stream therethrough and deviating therefrom only sufficiently to avoid impingement of one spray stream upon an adjacent spray stream.

3. The process of claim 1 in which the hydrocarbon to be decomposed is passed in substantially liquid form through opposite longitudinal walls of the chamber through conduits having their longitudinal axis lying in a common transverse plane and substantially perpendicular to the wall of entry, each being thermally shielded from the furnace wall through which it enters the chamber and the hydrocarbon is sprayed into the chamber from each conduit as an atomized liquid spray.

References Cited in the file of this patent

UNITED STATES PATENTS

| 2,440,424 | Wiegand et al. | Apr. 22, 1948 |
| 2,597,232 | Ekholm et al. | May 20, 1952 |
| 2,659,662 | Heller | Nov. 17, 1953 |
| 2,851,337 | Heller | Sept. 9, 1958 |

FOREIGN PATENTS

| 711,312 | Great Britain | May 6, 1952 |